United States Patent [19]
Pötz

[11] 4,077,748
[45] Mar. 7, 1978

[54] TURBOMACHINE PLANT COMPRISING COUPLED GAS TURBINE, SYNCHRONOUS ELECTRICAL MACHINE AND COMPRESSOR UNITS HAVING OPTIONAL OPERATING MODES

[75] Inventor: Franz Pötz, Burstadt, Germany

[73] Assignee: BBC Brown, Boveri & Company Limited, Baden, Switzerland

[21] Appl. No.: 619,311

[22] Filed: Oct. 3, 1975

[30] Foreign Application Priority Data

Oct. 25, 1974 Germany .............................. 2450710

[51] Int. Cl.$^2$ ............................................ F04B 17/00
[52] U.S. Cl. ................................. 417/319; 290/4 R; 290/52; 417/374; 417/251; 417/405; 60/682
[58] Field of Search .................. 60/650, 682, 643, 645; 290/4 R, 4 B, 4 C, 52; 417/251, 374, 405, 319

[56] References Cited

U.S. PATENT DOCUMENTS

| 1,753,280 | 4/1930 | Baumann et al. ................. 417/251 X |
| 3,891,860 | 6/1975 | Hutarew ................................ 417/374 |
| 3,943,374 | 3/1976 | Clements ................................ 290/52 |

Primary Examiner—Allen M. Ostrager
Attorney, Agent, or Firm—Pierce, Scheffler & Parker

[57] ABSTRACT

A turbomachine plant comprises a gas turbine, a synchronous electrical machine operable as a motor or generator, and a compressor all mounted on the same shafting and adapted to be coupled together for two optional operating modes. In a first operating mode, the gas turbine serves to drive the synchronous electrical machine for generation of electrical power and the compressor is not utilized. In the second operating mode, the synchronous electrical machine operating as a motor serves to drive the compressor for gas compression and the gas turbine is not utilized. When in the first operating mode the compressor is not disconnected by conventional clutch means from the gas turbine-synchronous electrical machine group but rather always remains connected to that group and is arranged by suitable valving so as to rotate in a vacuum type of operation with a power loss which is slight in relation to the gas turbine. If desired a permanent type of coupling can also be provided in the shafting between the gas turbine and synchronous electrical machine units in lieu of a disengageable clutch.

7 Claims, 1 Drawing Figure

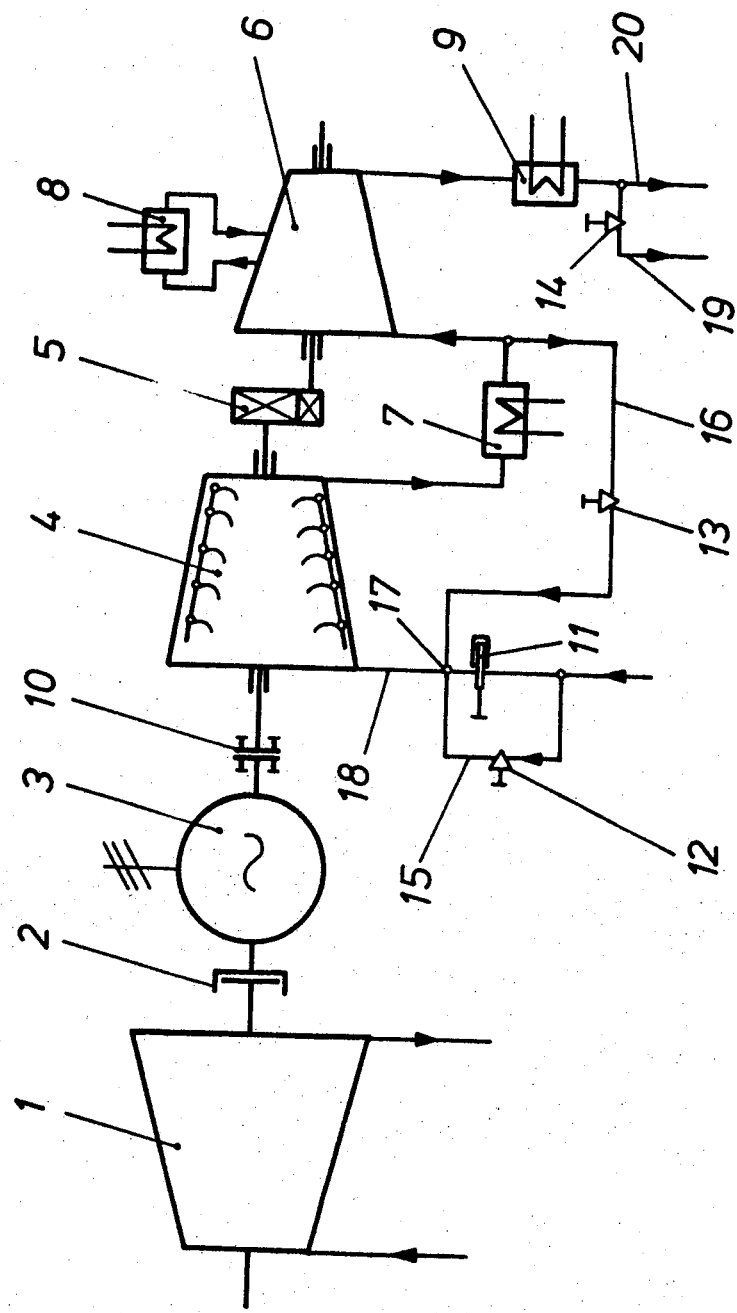

TURBOMACHINE PLANT COMPRISING COUPLED GAS TURBINE, SYNCHRONOUS ELECTRICAL MACHINE AND COMPRESSOR UNITS HAVING OPTIONAL OPERATING MODES

The present invention relates in general terms to turbomachine plants comprising a gas turbine, a synchronous machine and a compressor plant and in which the times at which the gas turbine and the compressor plant are operated are substantially separated for example as is the case in air accumulator - gas turbine plants. In charging operation the gas turbine is normally disengaged by means of a clutch and the synchronous machine in its function as a motor drives the compressor or compressors. When operated to generate current or energy, the compressor or compressors are disengaged and the gas turbine drives the synchronous machine in its function as a generator.

The present invention relates more particularly to a method for operating a turbomachine plant, comprising a gas turbine, a synchronous machine adapted to operate alternately as driven machine and power generating machine and a compressor plant, the gas turbine delivering no power in compressor operation and the synchronous machine driving the compressor and the gas turbine being connected to the circuit or delivering power for energy generation operation so as to drive the synchronous machine, the compressor plant being changed to an operating state of low power consumption. An arrangement of this type is disclosed in U.S. application Ser. No. 515,058 filed Oct. 15, 1974 now abandoned in the name of Hans Hoffeins.

In the method according to that application, the compressor plant is normally disengaged for gas turbine operation, i.e current generating operation, the gas turbine driving only the synchronous machine. In the method according to that application, a clutch must therefore also be provided between the compressor plant and the synchronous machine. The invention according to that application provides that the gas turbine is connected for energy generation, i.e. current generation during compressor operation only in the event of an emergency i.e. if the delivery of electrical energy (the changeover to gas turbine operation) is suddenly demanded during compressor operation and the compressor plant is not disengaged. Despite the steps provided in the invention according to that application for changeover of the compressor plant to an operating state with a low power consumption, the said compressor plant nevertheless consumes between 10 to 20% of the gas turbine output when it is driven idly in current generating operation.

The object of the present invention is to modify i.e. to improve the method according to the aforesaid application so that it will at least allow a clutch to be replaced by a rigid coupling between the compressor plant and the synchronous machine. The power consumption of the compressor plant in gas turbine operation i.e. current generation operation is to be confined to very low values.

In the method mentioned above for operating a turbomachine plant according to the present invention the problem is solved in that the compressor plant remains coupled to the synchronous machine for all operating states and during the generation of energy i.e. current it co-rotates in vacuum operation with a power loss which is slight when referred to the gas turbine.

A turbomachine plant for performing the previously-mentioned method and comprising a gas turbine, a synchronous machine adapted to operate alternately as driven machine and power producing machine and a compressor plant, and in which the compressor plant comprises several stages or individual compressors is therefore constructed according to the invention so that a rigid coupling is provided between the compressor plant and the synchronous machine and by the provision on the suction side of the first compressor of a first valve, which can be bypassed by a bypass duct containing a second valve, and by the provision, downstream of the first and/or second or further compressor, of recirculating ducts, each containing a third valve and extending into the suction duct between the first valve and the suction side of the first compressor and a discharge valve is disposed downstream of the last compressor.

In the method according to the invention or in the plant for performing the said method the compressor plant is no longer disengaged from the synchronous machine in current generating operation but co-rotates as a vacuum pump, thus dispensing with the need for a clutch between the compressor plant and the synchronous machine and enabling such a clutch to be replaced by s simple rigid coupling. In order to minimize the losses resulting from the co-rotating compressor plant during current generating i.e. energy generating operation, the invention provides that the compressor plant co-rotates in vacuum operation as already mentioned. According to a further embodiment of the invention this is achieved by means of the above-mentioned first valve on the suction side. According to the invention, the gas turbine can be started for current generation i.e. energy generation operation, the above-mentioned first valve on the suction side being closed and the discharged valve being open. The valve in the bypass line which bypasses the first valve and the valve in the recirculating duct is kept partially open. The last-mentioned valve is closed when the nominal speed is obtained.

Absolute pressures of between 0.03 to 0.005 bar can be obtained upstream of the compressor blading by means of the first valve disposed on the suction side in accordance with the invention if the compressor plant co-rotates as vacuum pump and depending on the compression ratio of the plant. This means that the mass flow throughput is correspondingly reduced to between 3 and 0.5%. The compressor plant operates against atmospheric pressure. The remaining power loss in current generating or gas turbine operation depends on the charging ratio, the compression ratio of the compressor plant and the residual mechanical losses resulting from this method of operation and varying between 0.2 to 1.8% of the gas turbine output. Furthermore, the method according to the invention permits very rapid changeover to current generating operation during charging operation. The method also permits the adoption of a simpler construction for the turbomachine plant because of the elimination of the multiple axial locating means and the associated construction problems normally resulting from the provision of two clutches.

The method according to the invention and the turbomachine plant for performing the said method will be described hereinbelow by reference to the accompanying diagrammatic drawing of the plant.

In the preferred embodiment the gas turbine designated with the numeral 1 is automatically coupled through an overrunning clutch 2 to the synchronous machine 3 when the gas turbine tends to overrun the synchronous machine. A compressor plant, comprising a low-pressure compressor 4 and a high-pressure compressor 6, is shown in the drawing on the right-hand side of the synchronous machine. The numeral 5 refers to a stepdown transmission which may be required for the production of very high compression ratios. The numerals 7 and 8 refer to intermediate coolers and the numeral 9 to an output cooler.

A "rigid" or "non-disengageable" coupling 10, i.e. a coupling which is fixedly joined to the associated shaft parts, is provided between the compressor plant 4, 5, 6 and the synchronous machine 3. The suction side of the compressor 4 is also provided with a slide, i.e., a gate valve 11 which can be bypassed by means of a bypass duct 15 which contains a valve 12. A recirculating duct 16, containing a valve 13, is also provided downstream of the first compressor 4 to extend into the suction line 18 thereof at a position 17 between the valve 11 and the suction side of the said first compressor. A discharge duct 19 with a discharge valve 14 is also provided on the delivery side downstream of the second compressor 6 which in this case is also the last compressor 6. The numeral 20 refers to the actual delivery duct which extends to an air accumulator, not shown, if the method according to the invention or the illustrated plant is used for an air accumulator — gas turbine plant. A non-return valve, not shown in the drawing, is incorporated into the delivery duct 20 downstream of the branch of the discharge duct 19 to prevent backflow or discharge of the compressed air in the duct 20 when the discharge valve 14 is open.

The individual process steps in the operation of the illustrated turbomachine plant will be described in detail:

(a) If the gas turbine 1 is started for generating current, the valve 11 will be closed and the discharge valve 14 open while the bypass valve 12 and the recirculating valve 13 is kept partially open. The amount of air which ingresses into the compressor 4 through the shaft gland and through the partially open valves 12 and 13 prevents the well-known rotating stall effect and associated hazards to the plant at partial speeds. After the nominal speed is reached the valve 13 is closed while the bypass valve 12 remains open in order to supply the required minimum quantity of air to the compressor plant.

(b) When the plant is started for charging operation, the first valve 11, the valves 13 and 14 will be open and the compressor speed is raised to the nominal speed by motor drive means through the synchronous machine 3. The valves 13 and 14 are closed when the synchronous speed is reached and the charging operation commences.

In order to reduce the starting power for charging operation it is possible to select the starting procedure described above under item (a) also for charging operation. In this case the speed of the compressor plant 4, 6 is raised by motor drive means through the synchronous machine 3 to the nominal speed for charging operation, the valve 11 being closed and the discharge valve 14 remaining fully open and the valves 12 and 13 being kept partially open and the first valve 11 being opened and the valves 12, 13 and 14 being closed after the synchronous speed is reached.

(c) If electrical energy is demanded suddenly during charging operation, a rapid changeover in the plant according to the invention from charging operation to current generating or energy generating operation is possible in a particularly simple manner by starting the gas turbine 1, closing the first valve 11 and opening the valves 12 and 14.

It should be noted that the methods of operation described under items (b) and (c), i.e. closing or opening of the first valve 11 at the synchronous speed, also call for additional precautions in the inlet part of the axial-flow compressor, such as flow equalizers, strainers, register flaps, special inlet casings if the downstream axial blading is not to be endangered by the rotating stall effect induced by the preceding first valve.

The invention is not confined to the illustrated or described exemplified embodiment. Different modifications are possible more particularly with regard to the interconnection of the turbomachine plant. For example, a larger number of individual compressors can be provided instead of the two compressors 4 and 6 in the selected embodiment, i.e., the plant could comprise a low-pressure compressor, a medium-pressure compressor and a highpressure compressor. It should also be noted that compressors or individual compressors in this context always refer to a compressor enclosed by a casing and containing a small or large number of stages, each comprising a rotor and stator. The recirculating duct 16 need not only be provided downstream of the first compressor in the case of a plant comprising more than two individual compressors. It can also be disposed downstream of the second or downstream of further compressors (for example up to the penultimate compressor) or it is possible to provide recirculating ducts downstream of several compressors of the plant, for example after the first and after the penultimate compressor inclusive, all the said recirculating ducts which are provided with recirculating valves 13 extending into the suction line for the first compressor at a position between the valve 11 on the suction side and the suction side inlet into the first compressor.

Finally, in the case of compressors in which a substantial number of stages, each comprising a rotor and stator, are combined or bring out of the casing a recirculating duct after a specific number of stages, such duct extends into the suction duct between the valve 11 on the suction side and the suction side of the compressor. If the compressor enclosed by a casing contains a relatively large number of individual stages it is possible for a plurality of such recirculating ducts to be provided, each extending after a specific number of stages from the compressor casing and all extending into the suction duct at a position between the valve 11 on the suction side and the suction side compressor inlet, each of the said recirculating ducts in all these cases being provided with a valve which corresponds to the valve 13.

The plant according to the invention can however also be modified so that for large charging ratios the clutch between the gas turbine and the synchronous machine is also replaced by a "rigid coupling" because the respective windage losses become small under such charging conditions. This results in a further simplication and cost reduction of the plant.

Finally, as in the previously mentioned patent application, it is also possible in this case to operate the plant according to the invention when necessary as a gas turbo set withoutaccumulator if the delivery rate of the compressor plant is of the order of magnitude of the throughput of the gas turbine.

I claim:

1. In the method of operating a turbomachine plant comprising a gas turbine coupled to a synchronous electrical machine and which latter is coupled to a compressor wherein during a first operating mode of said plant said gas turbine drives said synchronous electrical machine which functions as an electrical generator and wherein during a second operating mode of said plant said synchronous electrical machine functions as an electrical motor and drives said compressor, the improvement which includes the steps of maintaining the coupling between said synchronous electrical machine and said compressor during both operating modes, and during said first operating mode reducing the air flow through said compressor to a low level and hence a corresponding low power consumption but which does not reach to the stall limit of the compressor.

2. A turbomachine plant having alternative dual operating modes comprising a gas turbine coupled to a synchronous electrical machine, a compressor coupled to said synchronous electrical machine during both operating modes, said gas turbine serving to drive said synchronous electrical machine during a first operating mode and which functions as a power generator, said synchronous electrical machine functioning as a motor during a second operating mode for driving said compressor for producing compressed air, a main control valve connected to the suction side of said compressor for regulating air flow through the compressor during said second operating mode, a by-pass line around said main control valve, and an auxiliary valve in said by-pass line for admitting a small amount of air flow through the compressor during said first operating mode and when said main valve is closed, the amount of air passed through said auxiliary valve being such as to reduce its power consumption to a low level but which does not reach to the stall limit of the compressor.

3. A turbomachine plant as defined in claim 2 wherein said compressor comprises a plurality of seriately connected stages, wherein a recirculating duct controlled by a valve therein extends from a connection in the air flow path intermediate adjacent stages to the suction side of the first stage of said compressor and wherein the outlet side of the last stage includes a discharge valve.

4. A turbomachine plant as defined in claim 3 wherein for starting operation in said first mode said main control valve is closed and said discharge valve is open, said auxiliary valve and said valve in said recirculating duct are partially open, and said valve in said recirculating duct is closed after a nominal speed is reached.

5. A turbomachine plant as defined in claim 3 wherein for starting operation in said second mode, said main control valve is open as are also said discharge valve and said valve in said recirculating duct, and said discharge valve and said valve in said recirculating duct are closed after said electrical machine reaches its synchronous speed.

6. A turbomachine plant as defined in claim 3 wherein for starting operation in said second mode, said main control valve is closed, said discharge valve is open, said auxiliary valve and said valve in said recirculating duct are partially open, said main control valve being opened and said auxiliary valve as well as said valve in said recirculating duct being closed after said electrical machine has reached synchronous speed.

7. A turbomachine plant as defined in claim 3 wherein for expediting a changeover from the second to the first operating modes said main control valve on said compressor is closed and said auxiliary valve and discharge valve are opened.

* * * * *